July 9, 1946.　　　　J. URMSTON　　　　2,403,693
ELECTRIC CABLE
Filed Dec. 12, 1941
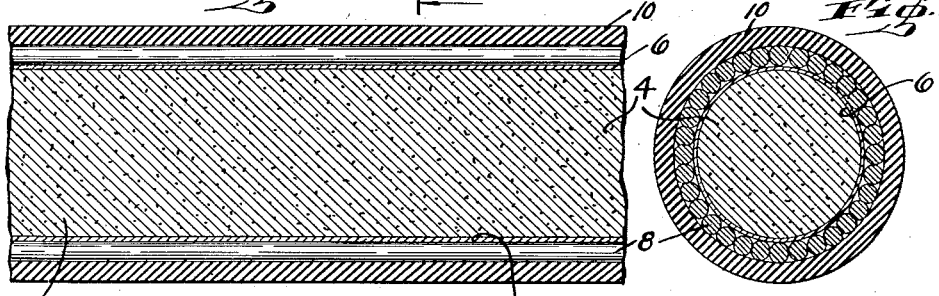
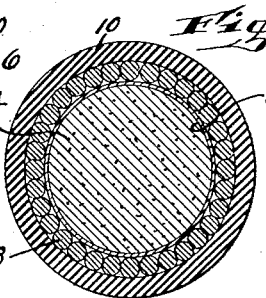
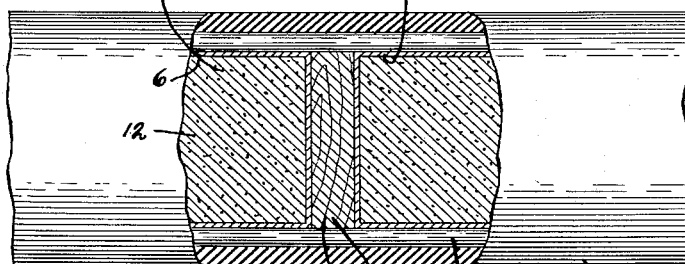
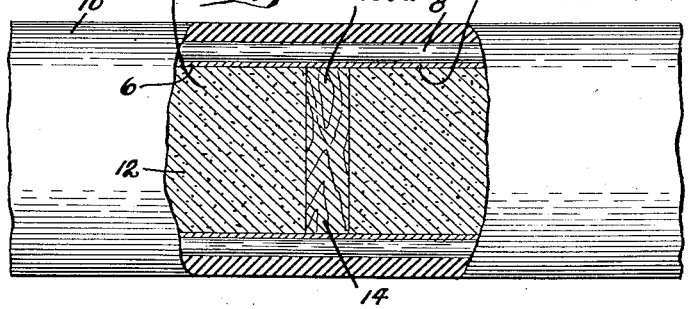
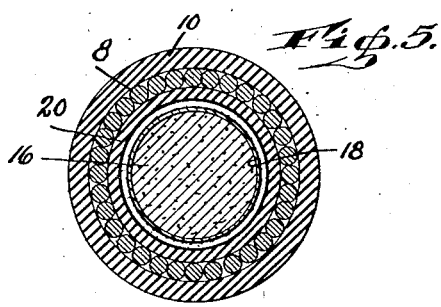
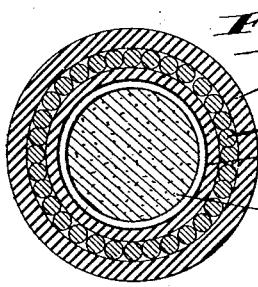
INVENTOR
James Urmston
BY Stebbins and Blenko
ATTORNEYS.

UNITED STATES PATENT OFFICE 2,403,693

ELECTRIC CABLE

James Urmston, Montclair, N. J., assignor to Callender's Cable & Construction Co., Ltd., London, England Application December 12, 1941, Serial No. 422,650

7 Claims. (Cl. 174—110)

This invention relates to an improvement in electric cables, and has for one of its objects the provision of a cable which is capable of carrying relatively large currents but which at the same time is sufficiently buoyant to float in water.

The usual electric cable combining conductor and insulation has a density much greater than water, and it is one of the purposes of this invention to alter the construction of such cables and to incorporate therein a buoyant element of low average density thereby to produce a cable possessing sufficient buoyancy to enable the same to float.

The cable of the present invention, therefore, comprises a combination of conductor, insulation and buoyant material eminently fitting the cable for carrying relatively large currents on the surface of water, the cable being at the same time highly resistant to deterioration and damage without impairing the necessary and highly desirable flexibility of the cable.

More specifically the present invention provides an electric cable in which the conductor is built up about a core of highly buoyant material, the conductor in turn being properly insulated with water-excluding insulating material.

Still more specifically the present invention provides a cable such as above briefly outlined in which the core referred to is of cellular material, that is, a material composed of myriads of gas-filled non-communicating cells, the conductor being stranded or braided, preferably the former, about this core. The core may be continuous or it may be in relatively short lengths. When relatively short lengths are employed then partitions or discs of wood, for example, are provided between adjacent lengths, which function to act as a support for the stranded conductor when the latter is subjected to longitudinal stress. About the core is a non-metallic sheath or skin or covering which is relatively gas impermeable. This skin will extend over the entire length and ends of the core where the core is continuous, and in the case of the discontinuous core, above referred to, the skin may be continuous throughout the length of the core, or each individual length may be completely enclosed in a skin or sheath. The skin or sheath may be integral with or separate from the core, but for ease of manufacture the integral construction is preferred.

Reverting to the material of the core: The core has been referred to as constructed of "cellular" material, and as above pointed out this term is to be interpreted to cover a material composed of gas-filled non-communicating cells, as distinguished from a material such as so-called sponge rubber in which the cells communicate with each other.

There are several methods of making the core. One method is to incorporate into an unvulcanized rubber compound a gas-producing material, that is, a material which decomposes and gives off gas when heated, so that when the rubber compound is being vulcanized by heat the gas thereby formed will expand the rubber into a body having myriads of non-intercommunicating cells. The walls of the cells are very thin and exceedingly so in the case of highly gassed material, so that diffusion of gas from or bursting of the cells on the outside surface can be expected, causing progressive deflation of the cells from outside to inside the material.

Aside from the fact that the cable core is cellular, it is to be noted that the core may be made from various materials. By way of example, materials such as natural rubber, artificial rubber and thermoplastics may be mentioned, and any of these can be made cellular by adding gas-producing compounds and then heating.

As to the skin or sheath or covering in which the core is enclosed: As above pointed out the cells of the core are thin-walled, and a certain amount of gas diffusion and cell bursting is to be expected, with a consequent decrease in the overall dimensions of the core. It is to prevent this loss of gas and consequent decrease in the core that I provide the skin, sheath or covering. There are many ways in which this element can be produced. In the case of a continuous core, the core may be drawn through a latex bath and then vulcanized; or a layer of rubber may be lapped around the core material. In the case of short lengths the core compound can be enclosed in unvulcanized rubber. In all cases the skin can be applied to the core material before the latter has been heated, so that upon heating the core material can be formed into a cellular mass and the core and skin vulcanized simultaneously.

The external dimensions of the finished product would be determined by the size and shape of the mould or container in which the vulcanization takes place.

As above pointed out the skin or sheath functions to support the walls of the cells on the surface of the core and prevent excessive gas diffusion and bursting of the cells; the skin, however, which is relatively gas impervious, serving to retain any gas which might escape from the cells.

In the accompanying drawing several embodiments of the cable have been illustrated.

Fig. 1 is a fragmentary longitudinal section of a cable constructed in accordance with one embodiment of my invention;

Fig. 2 is a section on the line 2—2 of Fig. 1;

Fig. 3 is a view similar to Fig. 1 of another embodiment of the invention;

Fig. 4 is a view similar to Fig. 1 of still another embodiment of the invention; and Figs. 5 and 6 are cross sectional views of two other embodiments of the invention.

Referring to the drawing in detail as shown in Figs. 1 and 2, the cable includes a buoyant core 4 of cellular material provided with a gas impermeable skin or sheath 6. A conductor 8 is built up about the core and is conveniently made of copper strands braided or stranded about the core. Insulation 10 which surrounds the conductor may be rubber or any other suitable water resistant material.

The core 4 in this embodiment of the invention is continuous throughout the length of the cable. The gas impervious skin or sheath 6 also extends continuously the length of the core, and about the ends of the core as well. As above pointed out the core is of cellular material, that is to say, it is composed of myriads of gas-filled thin-walled non-intercommunicating cells. It is evident that this skin or sheath supports the walls of the cells on the surface of the cellular core, and prevents excessive diffusion of gas through the cell walls, while any gas that might escape is retained by the skin. This construction prevents detrimental loss of gas from the core 4 and consequent shrinkage of the core, so that the danger of sufficient water entering the cable between the core and conductor to sink the cable is avoided.

In the embodiment of the invention illustrated in Fig. 3, the core, which is of the same material as the core 4 already referred to, instead of extending continuously throughout the cable as in Figs. 1 and 2, is made in relatively short lengths designated 12. These relatively short lengths are spaced from each other by a partition or disc 14 preferably of wood. These wooden discs act as a support for the cable conductor to prevent pulling down of the same when the cable is subjected to a longitudinal stress.

In this embodiment of the invention each core length 12 is completely enclosed in a relatively gas impermeable skin or sheath 6 which is the same as the skin or sheath 6 of Figs. 1 and 2.

The embodiment of the invention illustrated in Fig. 4 is identical with that of Fig. 3 except that instead of providing a gas impermeable skin or sheath 6 for each individual core length, the skin or sheath is continuous and completely encloses the core lengths and the discs 14.

In the embodiment of the invention illustrated in Fig. 5 I provide a buoyant cable comprising relatively short lengths of cellular material, these lengths being designated 16. They are similar to the lengths 12 of Fig. 3 in that each is completely enclosed in a gas impermeable skin or sheath 18. These core lengths, in practice, will be separated from each other by conductor-supporting wooden discs similar to the discs 14 of Figs. 3 and 4. Surrounding the core assembly is a rubber tube 20. Gas under pressure is introduced between the skin 18 and this tube, sufficient pressure being employed to cause the tube to contact the conductor 8 throughout the length of the cable, and also to compress the core lengths, which, so long as they contain their original gas charge and are not placed under compression are of such dimensions as to fill the tube 20 to hold it against the conductor. In the event that this cable is punctured, allowing the gas to escape from the space between the core and tube, it will be apparent that the lengths 16 will expand thereby filling the tube 20 and forcing it against the conductor to prevent the ingress of sufficient water to sink the cable.

The construction in Fig. 6 is similar to that of Fig. 5, except that the skin 18 of Fig. 5 has been omitted. When using this type of construction I prefer to use the same kind of gas between the core 16 and the tube 20 as is employed in the cells of the core, to reduce diffusion of gas from the core.

In both Figs. 5 and 6 I may employ continuous cores as distinguished from relatively short lengths, if desired.

For purposes of clarity I have made no attempt in any of the drawings to show the cells of the core material.

As above pointed out the core may be made from various materials—not necessarily of rubber—but in all cases must be composed of myriads of gas-filled non-communicating cells. The mode of making the core material does not constitute part of this invention, inasmuch as the core material may be made by processes existing prior to this invention.

The skin or sheath of Figs. 1 to 5 is essential, and as described may be continuous throughout the length of the cable or discontinuous; it may be separate from or integral with the core material; but in all cases it must be relatively gas impermeable, sufficiently so in any event to prevent any substantial loss of gas out of the core.

It is to be uderstood that various changes may be made in the details of construction and arrangement of parts hereinabove shown and described without departing from the spirit and scope of the invention.

I claim:

1. An electric cable comprising a central flexible core of cellular material composed of gas-filled, non-intercommunicating cells, a relatively gas-impermeable skin or sheath around the longitudinal surface of the core, an annular flexible conductor about the skin or sheath, and an insulating and water-excluding covering surrounding the conductor, the whole assembly providing a flexible cable which will float on water.

2. An electric cable comprising a continuous flexible core of cellular material enclosed in a relatively gas-impermeable covering, an annular flexible conductor built up about the core, and an insulating water-excluding covering surrounding the conductor, the assembly providing a flexible cable capable of floating in water.

3. A buoyant electric cable comprising an annular flexible conductor, an insulating water-excluding covering surrounding the conductor, and a core of cellular material composed of gas-filled, non-intercommunicating cells surrounded by a relatively gas-impermeable non-metallic covering substantially filling the space within the annular conductor.

4. A buoyant electric cable comprising an annular flexible conductor, an insulating water-excluding covering surrounding the conductor, and a core substantially filling the space within the conductor, said core including relatively short lengths of cellular material, each length being completely surrounded with a relatively gas-impermeable covering.

5. A buoyant electric cable comprising an annular flexible conductor, a core substantially filling the space within the conductor, said core including relatively short lengths of cellular material composed of gas-filled, non-intercommunicating cells, each length being individually and completely enclosed in a relatively gas-impermeable covering, rigid means for supporting the conductor, and an insulating water-excluding covering surrounding the core length and supporting means.

6. A buoyant electric cable comprising a central core having non-intercommunicating gas-filled cells, a relatively gas-impermeable skin or sheath surrounding said core, an annular flexible conductor about the core, and an insulating and water-excluding non-metallic sheath surrounding the conductor.

7. A buoyant electric cable comprising a central core comprising relatively short lengths of a material composed of non-intercommunicating gas-filled cells, each length being completely surrounded by a relatively gas-impermeable skin or sheath, wooden discs intermediate adjacent core lengths, an annular flexible conductor about the core, and an insulating and water-excluding non-metallic sheath surrounding the conductor.

JAMES URMSTON.